(12) United States Patent
Farahani et al.

(10) Patent No.: US 9,644,667 B2
(45) Date of Patent: May 9, 2017

(54) FLOATING FASTENERS

(71) Applicant: Apple Inc., Cupertino, CA (US)

(72) Inventors: Houtan R. Farahani, San Ramon, CA (US); Brett W. Degner, Menlo Park, CA (US); William F. Leggett, San Francisco, CA (US); Mikael M. Silvanto, San Francisco, CA (US); Bartley K. Andre, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 533 days.

(21) Appl. No.: 13/868,037

(22) Filed: Apr. 22, 2013

(65) Prior Publication Data

US 2014/0109379 A1 Apr. 24, 2014

Related U.S. Application Data

(60) Provisional application No. 61/715,828, filed on Oct. 18, 2012.

(51) Int. Cl.
*F16B 39/02* (2006.01)
*G06F 1/16* (2006.01)
*F16B 5/06* (2006.01)

(52) U.S. Cl.
CPC ............ *F16B 39/02* (2013.01); *G06F 1/1613* (2013.01); *G06F 1/1633* (2013.01); *F16B 5/0642* (2013.01); *F16B 5/0664* (2013.01); *Y10T 29/49948* (2015.01)

(58) Field of Classification Search
CPC .......... F16B 39/02; F16B 39/22; F16B 39/24; F16B 39/28; F16B 39/282; F16B 27/04; F16B 27/045; F16B 27/046; F16B 5/02; F16B 5/0216; F16B 5/0225; F16B 5/025; F16B 5/0258; F16B 5/0642; Y10T 29/49948
See application file for complete search history.

(56) References Cited

U.S. PATENT DOCUMENTS

| | | | | |
|---|---|---|---|---|
| 3,455,362 A | * | 7/1969 | Mohrman | F16B 4/004 411/103 |
| 3,700,020 A | * | 10/1972 | Wallace | F16B 21/09 411/512 |
| 4,486,133 A | * | 12/1984 | Pletcher | F16B 37/046 411/337 |
| 4,867,599 A | * | 9/1989 | Sasajima | B62D 1/16 24/297 |

(Continued)

*Primary Examiner* — Christopher M Koehler
(74) *Attorney, Agent, or Firm* — Downey Brand LLP

(57) ABSTRACT

One or more floating fastener assemblies used to fasten components together are described. In some embodiments, the components are top and bottom portions of an enclosure of a computing device. Each floating fastener assembly can include a fastener having at least one surface that can engage with a surface of the enclosure to limit the rotation of the fastener during fastening. Each floating fastener can also include a clearance area for the fastener to "float" in a lateral direction with respect to the enclosure. Thus, when corresponding openings in the top and bottom portions of the enclosure are not exactly aligned, each fastener can shift laterally to allow screws to engage to fasten the top and bottom portions together.

15 Claims, 14 Drawing Sheets

(56) References Cited

U.S. PATENT DOCUMENTS

| | | | | |
|---|---|---|---|---|
| 4,878,791 A * | 11/1989 | Kurihara | ............... | F16B 29/00 411/41 |
| 4,929,136 A * | 5/1990 | Mee | ............... | F16B 5/025 403/144 |
| 5,046,904 A * | 9/1991 | Malinow | ............... | F16B 5/025 411/15 |
| 5,176,482 A * | 1/1993 | Reinl | ............... | F16B 5/025 403/387 |
| 6,657,868 B1 | 12/2003 | Hsue | | |
| 6,811,363 B1 * | 11/2004 | Minnich | ............... | F16B 37/044 411/104 |
| 7,646,595 B2 | 1/2010 | Barsun et al. | | |
| 8,066,461 B2 | 11/2011 | Travers | | |
| 2004/0042869 A1 * | 3/2004 | Tucker, II | ............... | E05B 15/0245 411/172 |
| 2004/0136805 A1 * | 7/2004 | Miller | ............... | F16B 5/025 411/112 |
| 2005/0067548 A1 * | 3/2005 | Inoue | ............... | F16L 55/035 248/635 |
| 2005/0134069 A1 * | 6/2005 | Odulio | ............... | B62D 24/02 296/35.1 |
| 2005/0169727 A1 * | 8/2005 | Cosenza | ............... | F16B 37/044 411/120 |
| 2006/0147292 A1 * | 7/2006 | Lebot | ............... | E04F 13/0835 411/182 |
| 2007/0297869 A1 * | 12/2007 | Kunda | ............... | F16B 37/044 411/108 |
| 2009/0103997 A1 * | 4/2009 | Csik | ............... | F16B 37/045 411/112 |
| 2009/0129885 A1 * | 5/2009 | Csik | ............... | F16B 37/046 411/103 |
| 2011/0289755 A1 * | 12/2011 | Bleus | ............... | F16B 19/00 29/428 |
| 2012/0090146 A1 | 4/2012 | Figge et al. | | |
| 2013/0121789 A1 * | 5/2013 | Hendrix | ............... | F16B 5/025 411/511 |

* cited by examiner

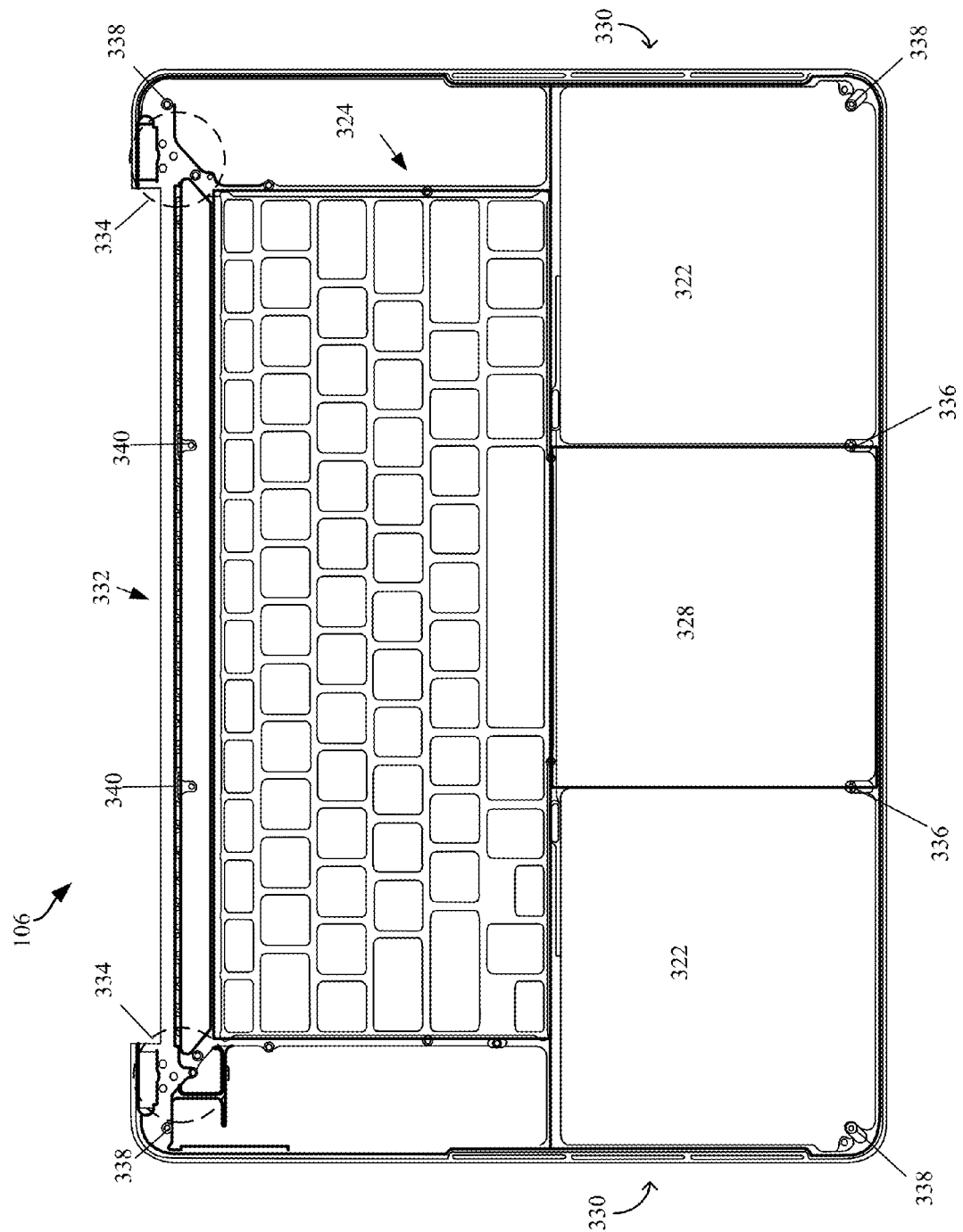

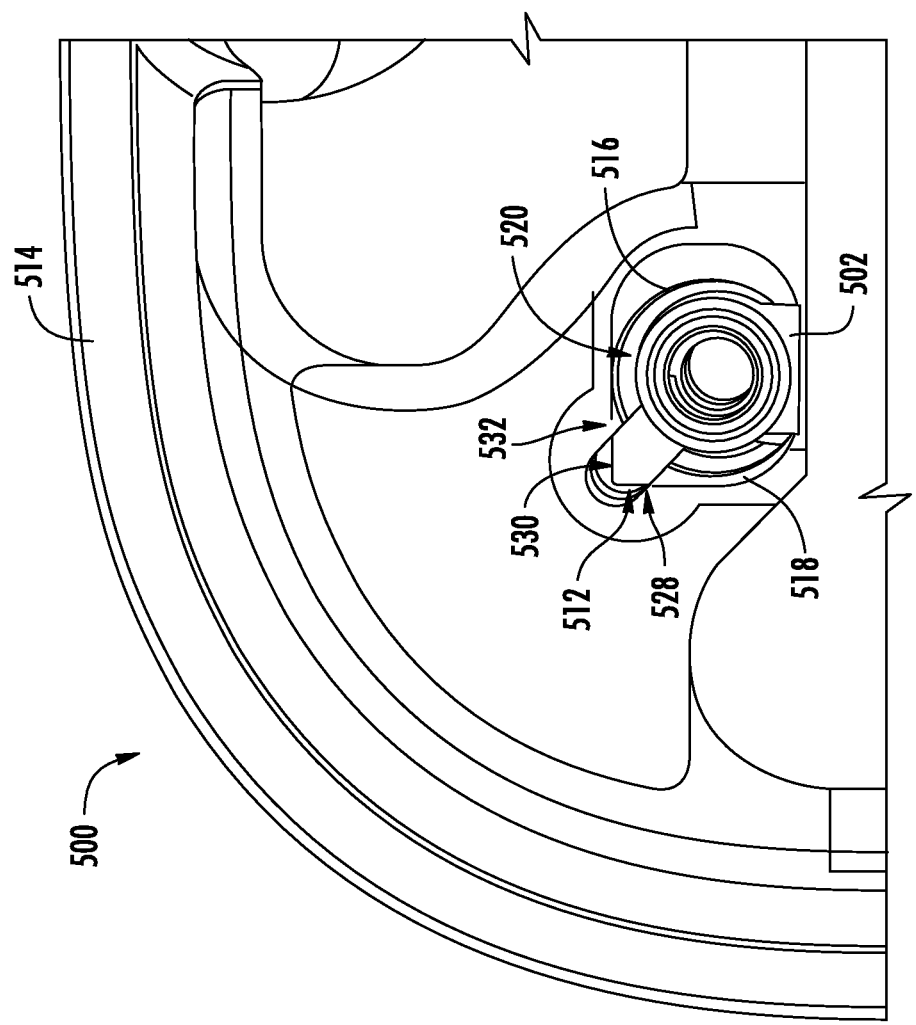
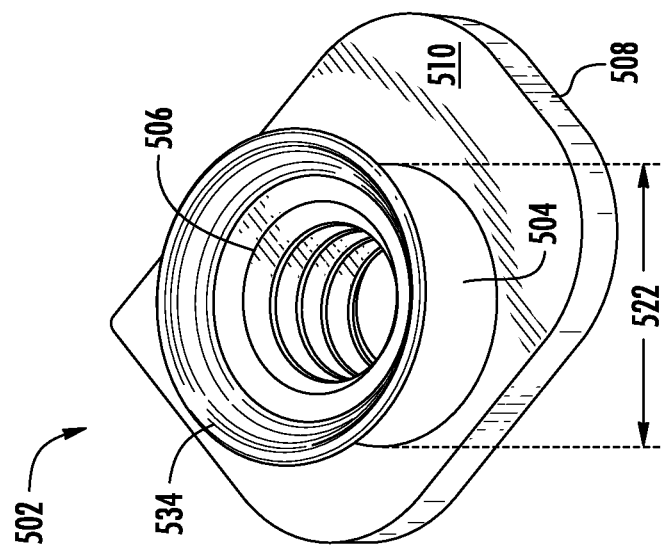
FIG. 5B
FIG. 5A

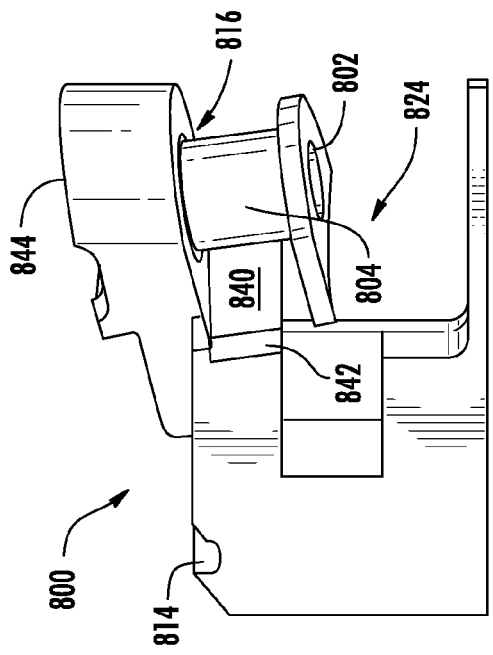
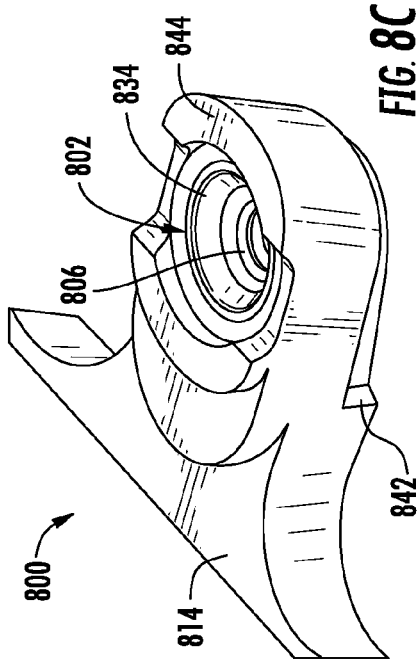
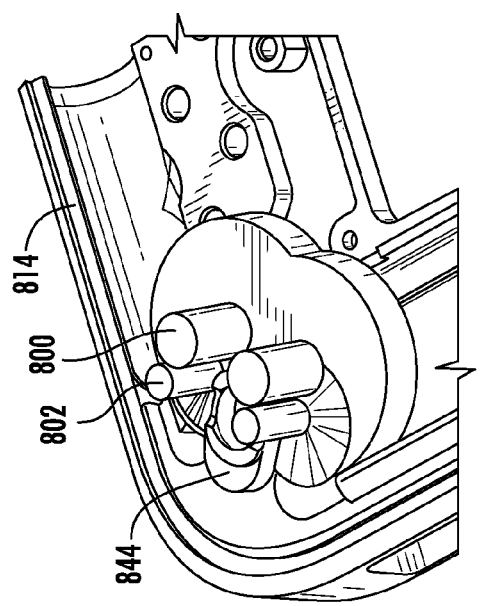

FLOATING FASTENERS

CROSS-REFERENCE TO RELATED APPLICATIONS

This U.S. Patent Application claims priority under 35 USC 119(e) to U.S. Provisional Patent Application No. 61/715,828 filed Oct. 18, 2012 entitled "Floating Fasteners" by Degner et al. which is incorporated by reference in its entirety for all purposes.

FIELD OF THE DESCRIBED EMBODIMENTS

The present invention relates generally to fastening components, and more particularly to fastening components that allow for looser tolerances in the mass production of consumer products.

BACKGROUND

There are a wide variety of ways to fasten device components together. One common fastening approach is to use screws, particularly where the ability to disassemble the device components is desirable. This can often mean that the components to be fastened together need to have threaded holes or other features in order to accommodate the screws. In many cases, each of the components or items to be fastened together can have holes that are sized and threaded for a particular screw. The screw can then be inserted into aligned corresponding holes in each component.

In mass produced devices such as portable electronic devices, such threaded holes are often built into an integrated portion of the component material itself. Multiple matching holes in corresponding components can be used to provide secure fastening of the components. For example, screws and holes can be strategically placed in portions of the outer housing components of a portable electronic device or other consumer product such that they can be fastened together in a secure fashion. However, the use multiple screws and screw holes can make it difficult to position the holes reliably such that they are align correctly with holes in a corresponding part. As such, the use of multiple screws and screw holes spaced apart on mating components often results in the need for relatively tight tolerances with respect to the size and location of the screw holes. Any introduction of relatively tight part tolerances in the context of mass production tends to increase costs, part rejection rates and production times. In addition, the use of threaded holes in a device component itself can result in the need to replace the entire device component if the threads become stripped, damaged or otherwise unusable in conjunction with a suitable fastening screw.

SUMMARY

It is an advantage of the present disclosure to provide parts and components that have looser tolerances with respect to their fastening aspects, and that still result in the functional and reliable fastening of those parts and components. This can be accomplished through the use of floating fastener assemblies for fastening of two or more parts together.

In various embodiments, a floating fastener assembly includes a fastener having a cylindrical portion and a flange, wherein the cylindrical portion has a threaded opening configured to accept a screw, and wherein the flange has a top surface and at least one stop surface. The floating faster assembly can also include a first portion of the enclosure that includes a clearance opening configured to accept the cylindrical portion of the fastener. The diameter of the clearance opening is preferably suitably larger than an outer diameter of the cylindrical portion of the fastener so as to provide a clearance area between the diameter of the clearance opening and the outer diameter of cylindrical portion of the fastener. The floating faster assembly can additionally include a cavity having an upper surface and at least one datum surface, wherein the upper surface is configured to engage with the top surface of the fastener and the at least one datum surface is configured to engage with the at least one stop surface of the fastener. The floating faster assembly can further include a second portion of the enclosure having an enclosure opening, wherein when the enclosure opening is substantially aligned with the threaded opening of the fastener, the screw can threadably engage the first and second portions of the enclosure.

In one particular embodiment, an enclosure for a computing device having a lid portion and a base portion is described. The base portion includes a number of floating fasteners, with each floating fastener having a cylindrical portion and a flange. Each cylindrical portion has a threaded opening configured to accept a screw, and each flange has a top surface and at least one stop surface. The base portion can also include a top case having a number of clearance openings configured to accept the floating fasteners, each clearance opening configured to accept the cylindrical portion of a corresponding floating fastener. In some cases, the diameter of each clearance opening is suitably larger than an outer diameter of the cylindrical portion of the corresponding floating fastener so as to provide a clearance area between the diameter of the clearance opening and the outer diameter of cylindrical portion. The top case can also include a number of cavities, each cavity having an upper surface and at least one datum surface, wherein each upper surface is configured to engage with the top surface of a corresponding floating fastener and each of datum surfaces is configured to engage with the stop surfaces of the corresponding floating fastener. The base portion can also include a bottom case configured to be removably fastened to the top case. The bottom case can have a number of enclosure openings, such that when the enclosure openings are aligned with the threaded openings of the plurality of floating fasteners, screws can threadably couple the top and bottom cases of the enclosure.

In some embodiments, an outer housing for a computing device is fastened using floating fasteners. The outer housing can include a bottom case adapted to contain a number of internal device components. The outer housing can also include a top case adapted to seal the internal device components within the outer housing. The outer housing can further include a number of floating fastener assemblies that are collectively adapted to removably fasten the top case to the bottom case. Each of the floating fastener assemblies can include a fastener having a flange and a threaded opening, wherein the threaded opening is configured to accept a screw and the flange has a plurality of stop surfaces. Each of the floating fastener assemblies can also include a clearance opening associated with the top case, wherein the clearance opening is configured to accept a fastener and a diameter of the clearance opening is suitably larger than an outer diameter of the fastener so as to provide a clearance area between the clearance opening and the fastener. Each of the floating fastener assemblies can also include a cavity having a number of datum surfaces, wherein the datum surfaces are configured to engage with the stop surfaces. Each of the floating fastener assemblies can also include an enclosure opening associated with the bottom case, wherein when the enclosure opening is substantially aligned with the threaded opening of the fastener, the screw can threadably engage with the threaded opening of the fastener, thereby fastening the top case and bottom case together.

Methods for fastening two portions of an enclosure together are also disclosed. In some embodiments, the method involves positioning a top case of the enclosure such that a number of floating fasteners of the top case can accept screws, wherein each floating fastener comprise a cylindrical portion and a flange. Each cylindrical portion can have a threaded opening configured to accept a screw. Each flange can have a top surface and stop surfaces. The top case can include a number of clearance openings, each clearance opening configured to accept the cylindrical portion of a corresponding floating fastener. The diameter of each of the clearance openings can be suitably larger than an outer diameter of the corresponding cylindrical portion so as to provide a clearance area between the diameter of the clearance opening and the outer diameter of cylindrical portion. The top case can also include a number of cavities, each cavity having an upper surface and datum surface. The upper surface can be configured to engage with the top surface of a corresponding fastener. The datum surfaces are configured to engage with the stop surfaces of the floating fastener. The method also includes placing a bottom case on the top case such that the enclosure openings of the bottom case are roughly centered with corresponding floating fasteners of the top case. The method further includes placing a number of screws in the enclosure openings of the bottom case and partially engaging the screws with the threaded openings of the floating fasteners of the top case. The method also includes adjusting the position of the bottom case to align with the top case using an alignment tool. Finally, the method includes tightening the screws to fully fasten the top and bottom cases.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The embodiments will be readily understood by the following detailed description in conjunction with the accompanying drawings, wherein like reference numerals designate like structural elements, and in which:

FIG. 3B illustrates an internal view of the top case of the portable computing device of FIGS. 1-3;

FIGS. 5A and 5B illustrate isometric and top-down views of different portions of another embodiment of a floating fastener arrangement;

FIGS. 8A-8C illustrate a floating fastener arrangement at various stages of being formed in accordance with described embodiments;

DETAILED DESCRIPTION OF SELECTED EMBODIMENTS

The following disclosure describes various embodiments of fastening devices. Certain details are set forth in the following description and Figures to provide a thorough understanding of various embodiments of the present technology. Moreover, various features, structures, and/or characteristics of the present technology can be combined in other suitable structures and environments. In other instances, well-known structures, materials, operations, and/or systems are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods and components.

Representative applications of methods and apparatuses according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting, such that other embodiments may be used, and changes may be made without departing from the spirit and scope of the described embodiments.

The various embodiments relate to fasteners that can be used for the outer housing components of a computing device, such as any of the iMac® personal computer, MacBook® laptop computer or iPad® tablet computer manufactured by Apple Inc. of Cupertino, Calif. Although the subject computing device can be a portable computing device, including portable media players and cellular telephones, it can be readily appreciated that the various embodiments disclosed herein can also be used with larger personal computing devices, servers and the like. Furthermore, it can be readily understood that the fasteners can also be used in many other embodiments with other consumer products that are not computing devices. As such, the various inventive fastening screws, bolts, nuts and systems provided herein can be extended to a wide variety of other devices and applications, as can be readily appreciated in view of the entire disclosure.

Figure 1:
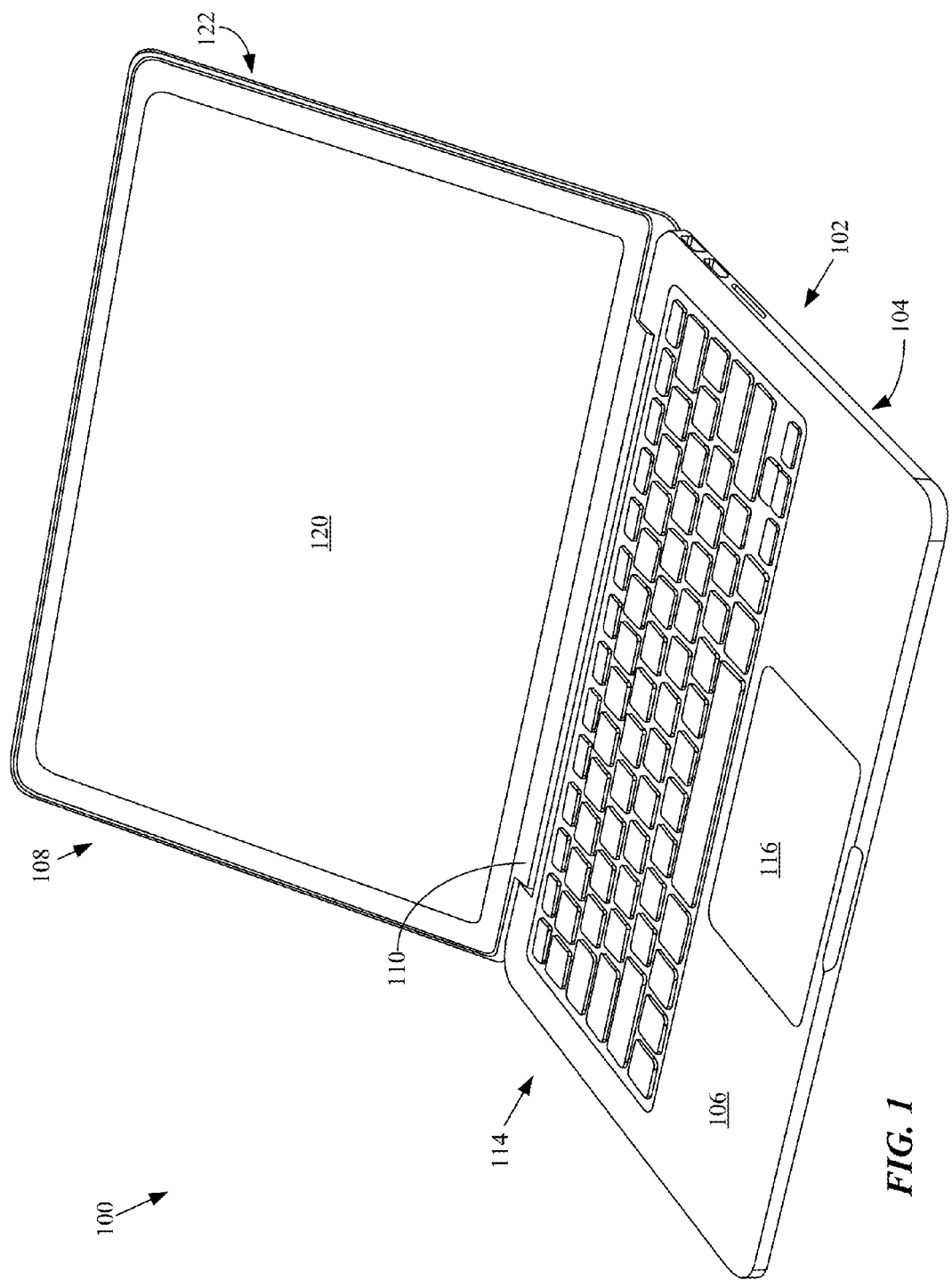
FIG. 1 illustrates a front facing perspective view of an embodiment of a portable computing device in an open (lid) state.

Referring first to FIG. 1, one example of a personal computing device in the form of a laptop computer 100 is shown in front perspective view laptop in an open (lid) state. Laptop computer 102 can include base portion 102 formed of bottom case 104 fastened to top case 106. Base portion 102 can be pivotally connected to lid portion 108 by way of clutch assembly 110 hidden from view by a cosmetic wall. Base portion 102 can include various internal components therein, such as processors, storage devices, busses, cards, power supplies, disk drives, I/O interfaces, modems, and the like. Top case 106 can be configured to accommodate various user input devices such as keyboard 114 and touchpad 116. Lid portion 108 can include display 120 and rear cover 122 that can add a cosmetic finish to lid portion 108 and also provide structural support to at least display 120.

Figure 2:
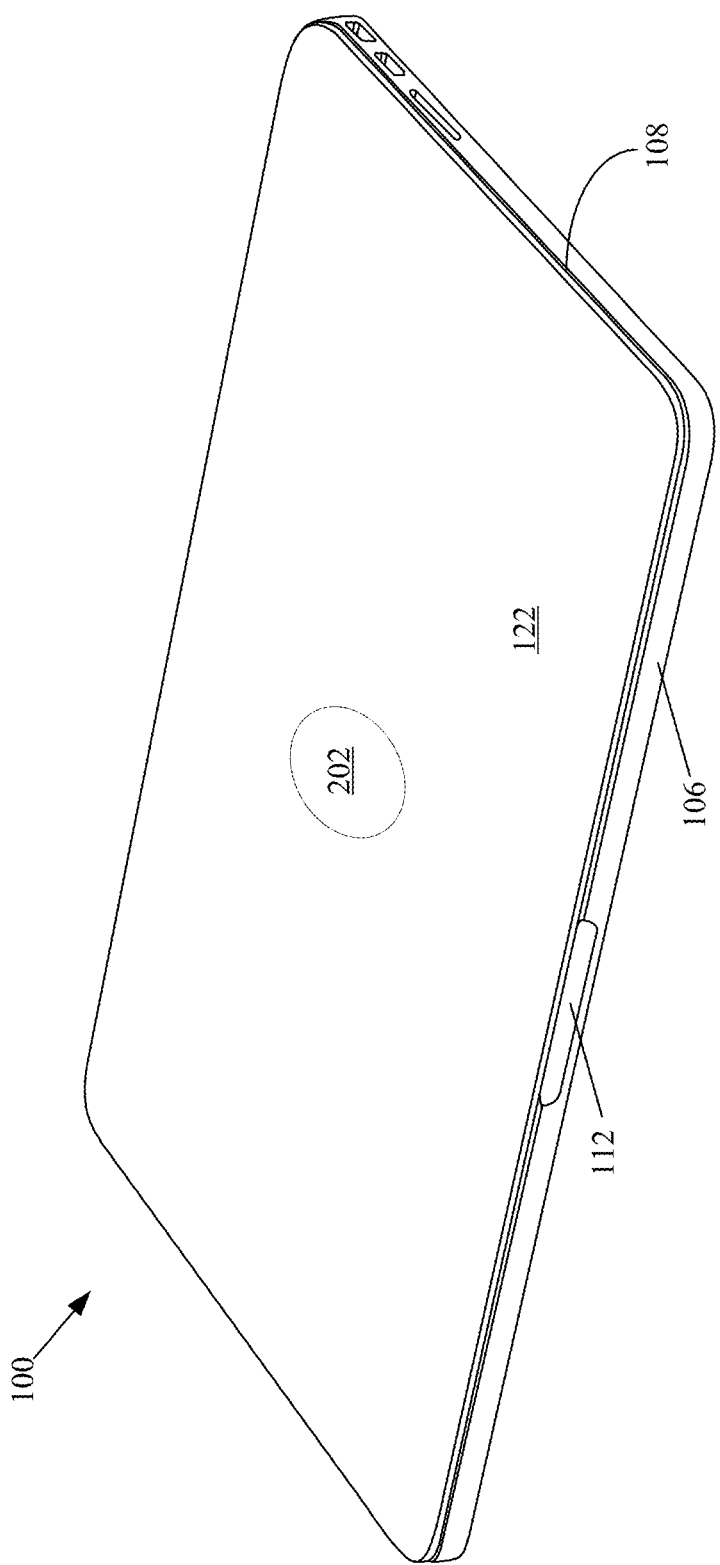
FIG. 2 illustrates the portable computing device of FIG. 1 in a closed (lid) state that shows rear cover and logo.

FIG. 2 shows portable computing device 100 in a closed (lid) configuration that shows rear cover 122 and logo 202. In one embodiment, logo 202 can be illuminated by light from display 120. It should be noted that in the closed configuration, lid portion 108 and base portion 102 form what appears to be a uniform structure having a continuously varying and coherent shape that enhances both the look and feel of portable computing device 100.

Figure 3A:
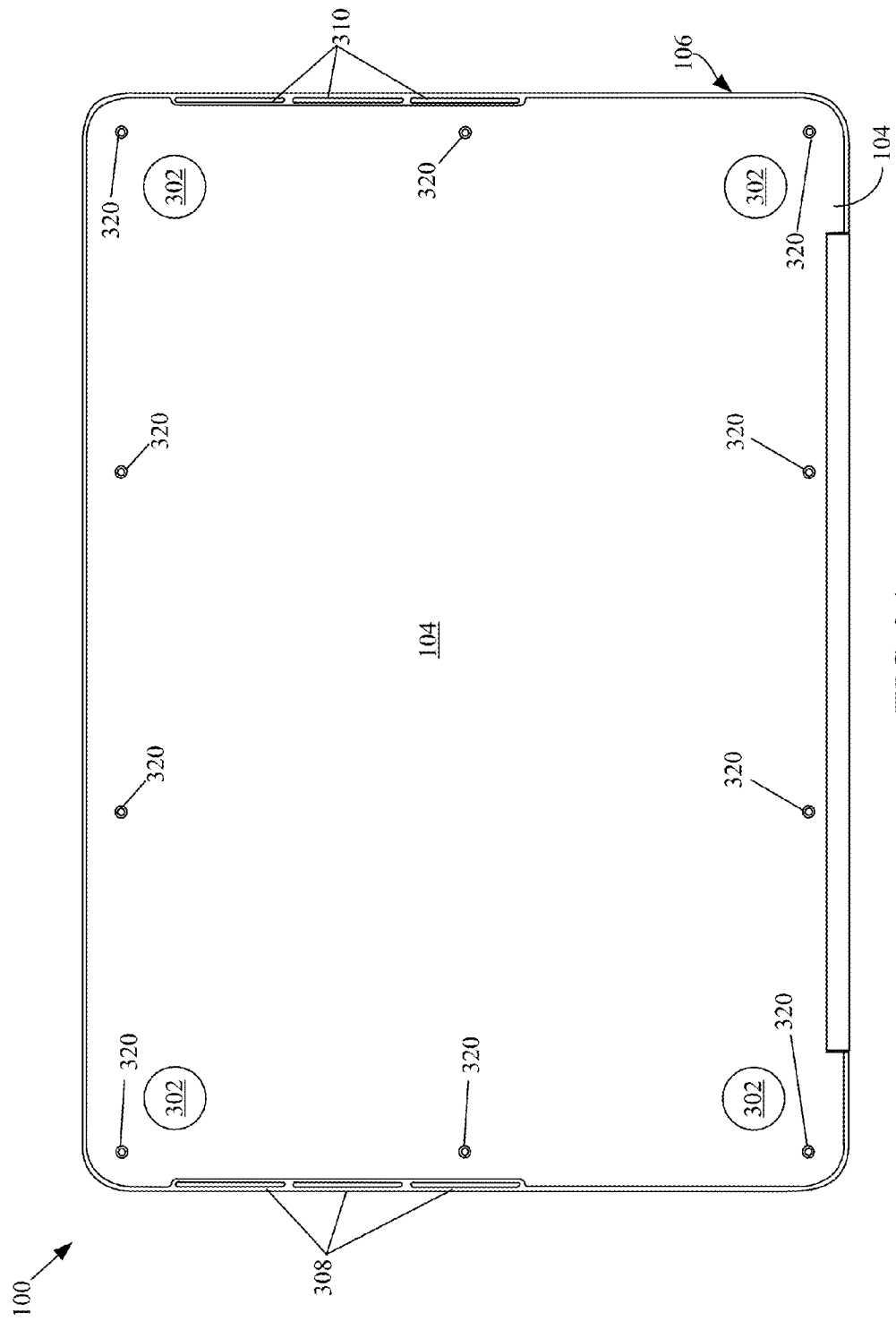
FIG. 3A illustrates an external view of bottom case of the portable computing device of FIGS. 1 and 2.
Figure 4A:
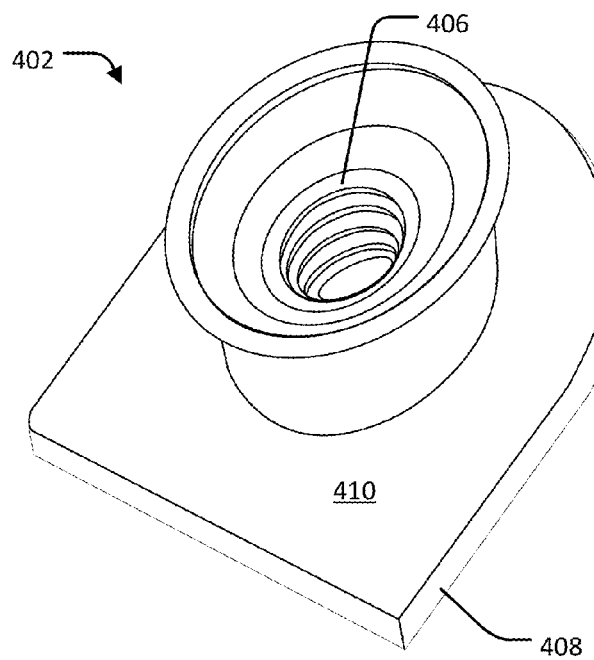
FIGS. 4A-4D illustrate isometric and top-down views of an embodiment of a floating fastener arrangement.
Figure 4B:
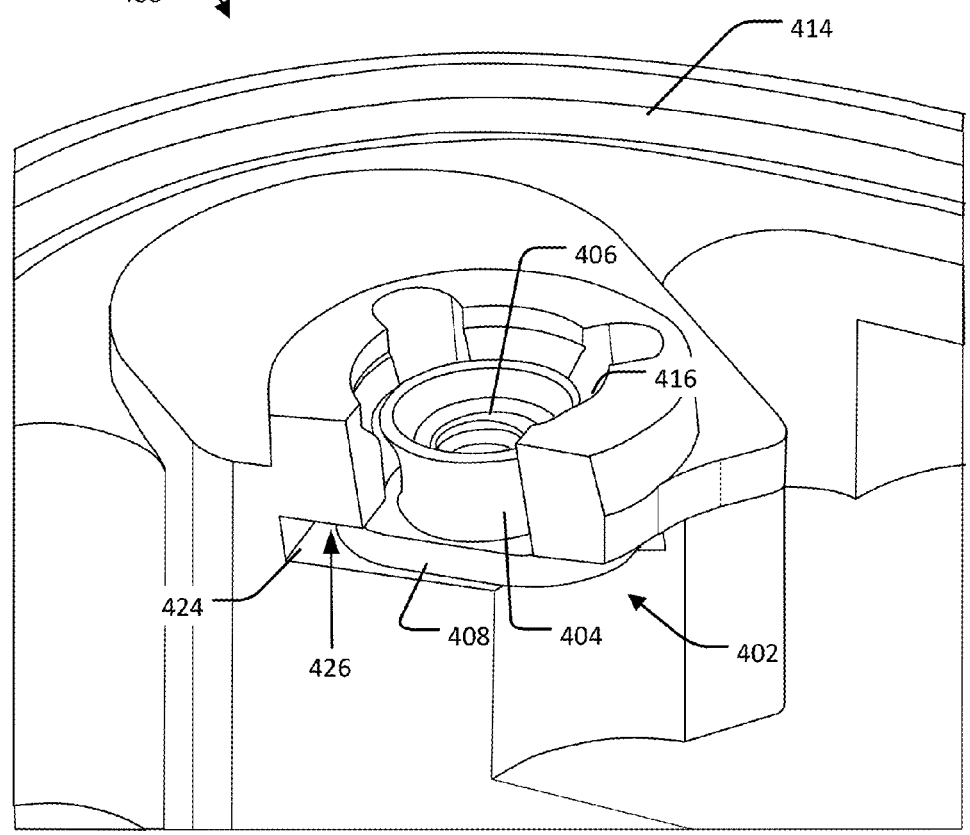
Figure 4C:
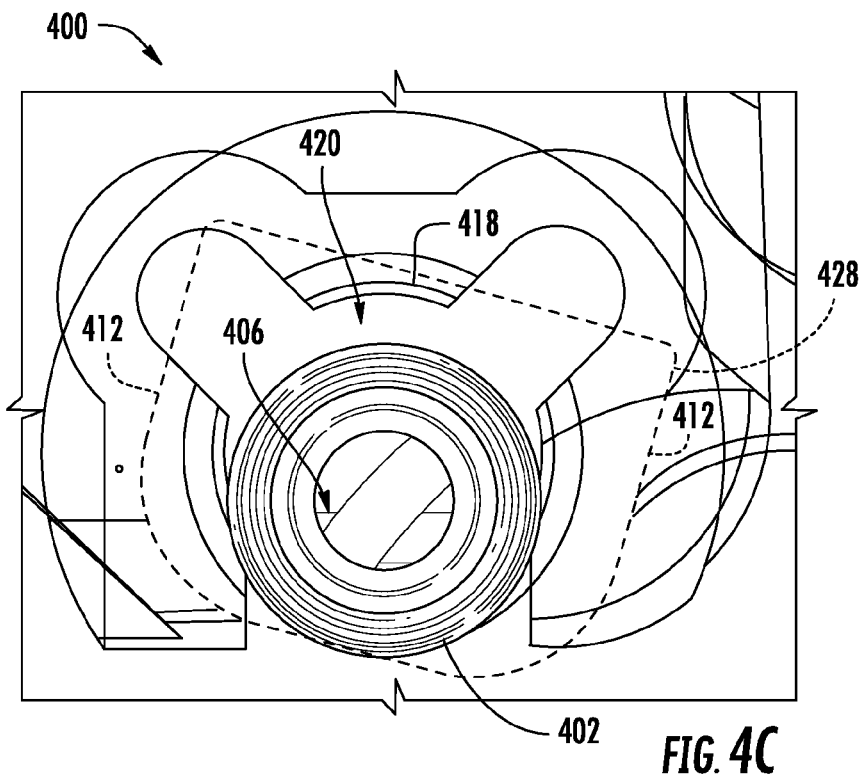
Figure 4D:
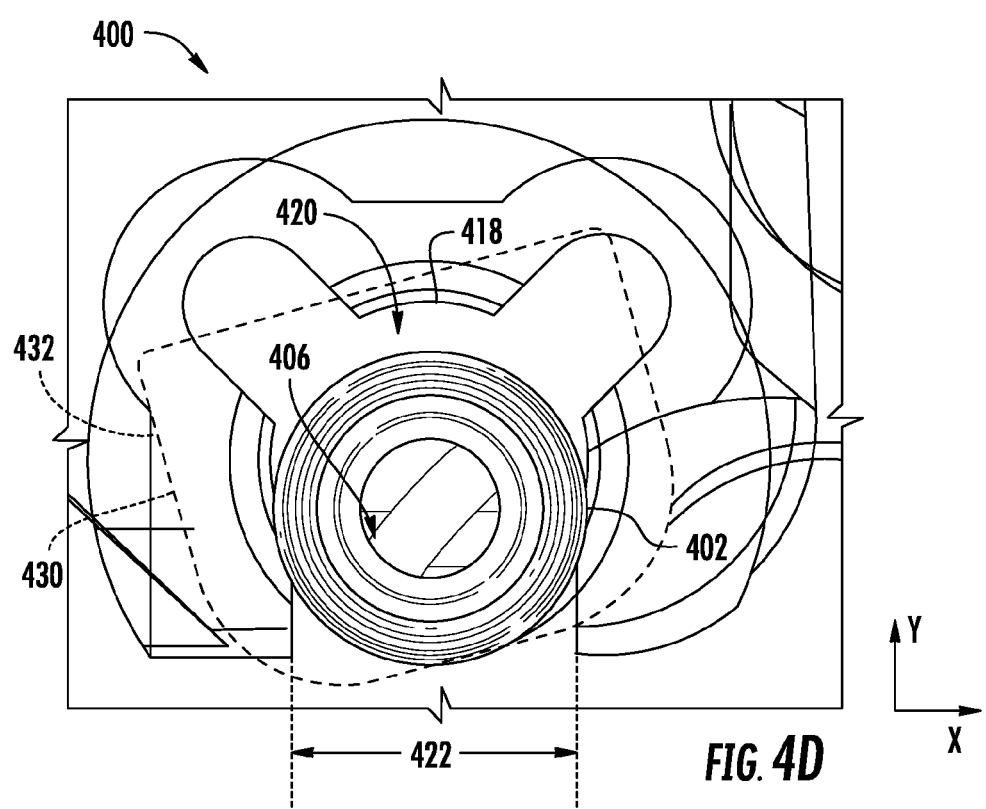

Continuing on, FIG. 3A shows an external view of bottom case 104 showing relative positioning of screws 320 used to secure bottom case 104 and top case 106 together. Screws 320 can pass through respective openings in bottom case 104 and threadably engage with threaded openings in top case 106. In some embodiments, screws 320 are configured to be removably fastened to bottom case 104 and top case 106. Support feet 302 can be formed of wear resistant and resilient material such as plastic. Also in view are multipurpose front side sequentially placed vents 308 and 310 that can be used to provide a flow of outside air that can be used to cool internal components. In the described embodiment, vents 308 and 310 can be placed on an underside of top case 106 in order to hide the vents from view as well as obscure the view of an interior of laptop computer 100 from the outside. Floating fastening methods described herein can be used to secure some or all of screws 320.

FIG. 3B shows an interior view of top case 106 showing various internal structural features. For example, top case 106 can include palm rest zones 322 that can be expected to experience an external load applied by a user resting a palm or hand on top case 106 in the vicinity of palm rest zones 322. Keyboard zone 324 can include keyboard support rib 326 that surrounds and defines a keyboard opening in keyboard zone 324. Other structural zones can include touch pad zone 328, side vents zone 330, rear vent zone 332 and clutch bolt zone 334. Top case 106 can include floating fasteners 336-340 for securing screws 320 (shown in FIG. 3A). As shown, floating fasteners 336-340 can be located at different portions of top case 106 and can be subject to different physical restraints. For example, corner fasteners 338 can be restricted by corner regions of the housing and front fasteners 336 can be restricted by the proximity to a touch pad to be positioned in touch pad zone 328. A number of embodiments of floating fasteners will be described herein which can be used to secure different screws 320 at different locations that can be dependent partially upon the physical restraints of the fasteners. These embodiments will be described and illustrated with reference to FIGS. 4-10 described below.

Turning now to FIGS. 4A-4D, an embodiment of a floating fastener arrangement 400 is shown in perspective and top-down views. As shown, floating fastener arrangement 400 includes fastener 402, which has a cylindrical portion 404 having a threaded opening 406. Threaded opening 406 is configured to accept a screw (not shown). Fastener 402 also has flange 408 having a top surface 410 and stop surfaces 412 and 430. Fastener 402 is positioned in a portion of enclosure 414. Enclosure 414 can be, for example, top case 306 of FIG. 3C. Enclosure 414 has a clearance opening 416, which is configured to accept cylindrical portion 404 of fastener 402. As shown, clearance opening 416 has a diameter 418 that is suitably larger than an outer diameter 422 of cylindrical portion 404 so as to provide a clearance area 420 between diameter 418 of clearance opening 416 and the outer diameter 422 of cylindrical portion 404 of fastener 402. Clearance area 420 allows fastener 402 to move in X and Y directions relative to enclosure 414. Thus, an opening of a corresponding enclosure portion is allowed a considerable amount of "float" or "play" during the alignment and coupling of the corresponding enclosure portions. Thus, when an enclosure opening is not suitably aligned with threaded opening 406, fastener 402 can shift laterally within clearance area 420 to allow a screw to properly seat within threaded opening 406. If more than one fastener is used to couple the corresponding enclosure portions, multiple floating fastener arrangements can be used. For example, referring back to FIGS. 3A-3C, opening corresponding to screws 320 of bottom case 304 can each be allowed a certain amount of play when being fastened to top case 306. This can permit looser location tolerances for the corresponding openings and provide greater ease of assembly.

Returning to FIGS. 4A-4D, enclosure 414 has cavity 424 having upper surface 426 and datum surfaces 428 and 432. During an assembly process when a screw is being screwed into threaded opening 406, flange 408 of fastener 402 is situated within cavity 424. Stop surface 412 can engage with datum surface 428 to limit rotation of fastener 402 in a clockwise direction. In addition, stop surface 430 can engage with datum surface 432 to limit rotation of fastener 402 in a counter clockwise direction. It should be noted that other surfaces of fastener 402 can engage with other surfaces of cavity 424 as fastener 402 is positioned within different regions of cavity 424 to limit rotation of fastener 402 during assembly. Additionally, upper surface 426 of cavity 424 can engage with top surface 410 of fastener 402, thereby preventing fastener 402 from coming out of clearance opening 416 during assembly. Furthermore, fastener 402 can have a flared portion 434 at an end opposite to flange 408, which can prevent fastener 402 from falling down through clearance opening 416. In these ways, fastener 402 can be stabilized during assembly when a screw is being threaded into threaded opening 406.

Moving now to FIGS. 5A and 5B, another embodiment of a floating fastener arrangement 500 is shown. As shown, fastener 502 has a cylindrical portion 504 having a threaded opening 506. Threaded opening 506 is configured to accept a screw (not shown). Fastener 502 also has flange 508 having a top surface 510 and stop surfaces 512 and 530. Fastener 502 is positioned in a portion of enclosure 514. Enclosure 514 can be, for example, top case 306 of FIG. 3C. Enclosure 514 has a clearance opening 516, which is configured to accept cylindrical portion 504 of fastener 502. As shown, clearance opening 516 has a diameter 518 that is suitably larger than an outer diameter 522 of cylindrical portion 504 so as to provide a clearance area 520 between diameter 518 of clearance opening 516 and the outer diameter 522 of cylindrical portion 504 of fastener 502. Clearance area 520 allows fastener 502 to move in a lateral direction relative to enclosure 514. Thus, an opening of a corresponding enclosure portion is allowed a considerable amount of "float" or "play" during the alignment and coupling of the corresponding enclosure portions. Thus, when an enclosure opening is not suitably aligned with threaded opening 506, fastener 502 can shift laterally within clearance area 520 to allow a screw to properly seat within threaded opening 506. During assembly, stop surface 512 can engage with datum surface 528 to limit rotation of fastener 502 in a clockwise direction. In addition, stop surface 530 can engage with datum surface 532 to limit rotation of fastener 502 in a counter clockwise direction. It should be noted that other surfaces of fastener 502 can engage with other surfaces of the cavity of enclosure 514 as fastener 502 is positioned within different regions of the cavity to limit rotation of fastener 502 during assembly. Additionally, an upper surface of the cavity can engage with top surface 510 of fastener 502, thereby preventing fastener 502 from coming out of clearance opening 516 during assembly. Furthermore, fastener 502 can have a flared portion 534 at an end opposite to flange 508, which can prevent fastener 502 from falling down through clearance opening 516. In these ways, fastener 502 can be stabilized during assembly when a screw is being threaded into threaded opening 506.

Figure 6A:
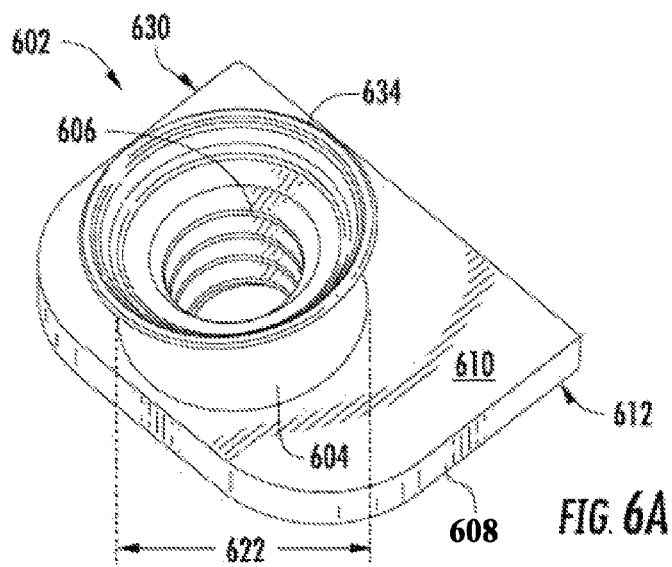
FIGS. 6A-6C illustrate isometric views of different portions of another embodiment of a floating fastener arrangement.
Figure 6B:
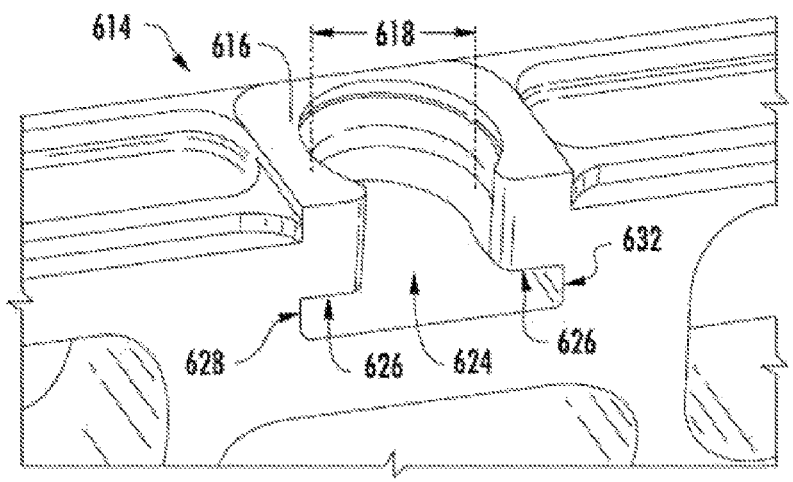
Figure 6C:
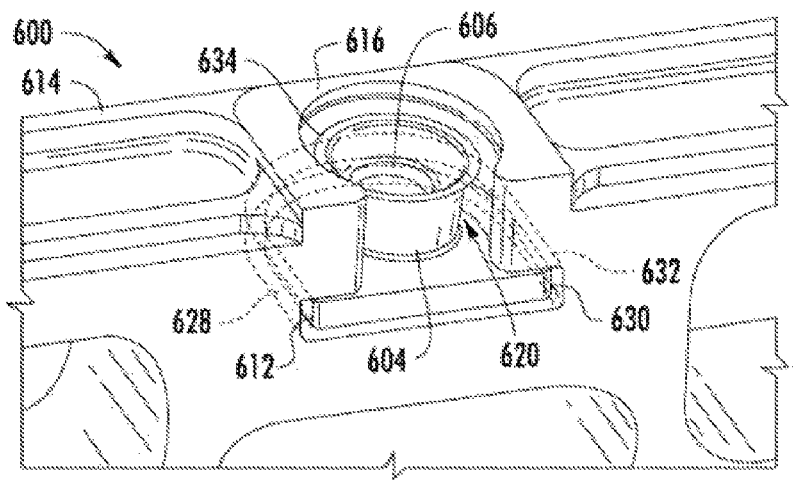

Continuing on, FIGS. 6A-6C show another embodiment of a floating fastener arrangement 600. As shown, floating fastener arrangement 600 includes fastener 602, which has a cylindrical portion 604 having a threaded opening 606. Threaded opening 606 is configured to accept a screw (not shown). Fastener 602 also has flange 608 having a top surface 610 and stop surfaces 612 and 630. Fastener 602 is positioned in a portion of enclosure 614. Enclosure 614 can be, for example, top case 306 of FIG. 3C. Enclosure 614 has a clearance opening 616, which is configured to accept cylindrical portion 604 of fastener 602. As shown, clearance opening 616 has a diameter 618 that is suitably larger than an outer diameter 622 of cylindrical portion 604 so as to provide a clearance area 620 between diameter 618 of clearance opening 616 and the outer diameter 622 of cylindrical portion 604 of fastener 602. Clearance area 620 allows fastener 602 to move in a lateral direction relative to enclosure 614. Thus, an opening of a corresponding enclosure portion is allowed a considerable amount of "float" or "play" during the alignment and coupling of the corresponding enclosure portions. Thus, when an enclosure opening is not suitably aligned with threaded opening 606, fastener 602 can shift laterally within clearance area 620 to allow a screw to properly seat within threaded opening 606. If more than one fastener is used to couple the corresponding enclosure portions, multiple floating fastener arrangements can be used.

Enclosure 614 can have cavity 624 having upper surface 626 and datum surfaces 628 and 632. During an assembly process when a screw is being screwed into threaded opening 606, flange 608 of fastener 602 is situated within cavity 624. Stop surface 612 can engage with datum surface 628 to limit rotation of fastener 602 in a clockwise direction. In addition, stop surface 630 can engage with datum surface 632 to limit rotation of fastener 602 in a counter clockwise direction. It should be noted that other surfaces of fastener 602 can engage with other surfaces of cavity 624 as fastener 602 is positioned within different regions of cavity 624 to limit rotation of fastener 602 during assembly. Additionally, upper surface 626 of cavity 624 can engage with top surface 610 of fastener 602, thereby preventing fastener 602 from coming out of clearance opening 616 during assembly. Furthermore, fastener 602 can have a flared portion 634 at an end opposite to flange 608, which can prevent fastener 602 from falling down through clearance opening 616. In these ways, fastener 602 can be stabilized during assembly when a screw is being threaded into threaded opening 606.

Figure 7A:
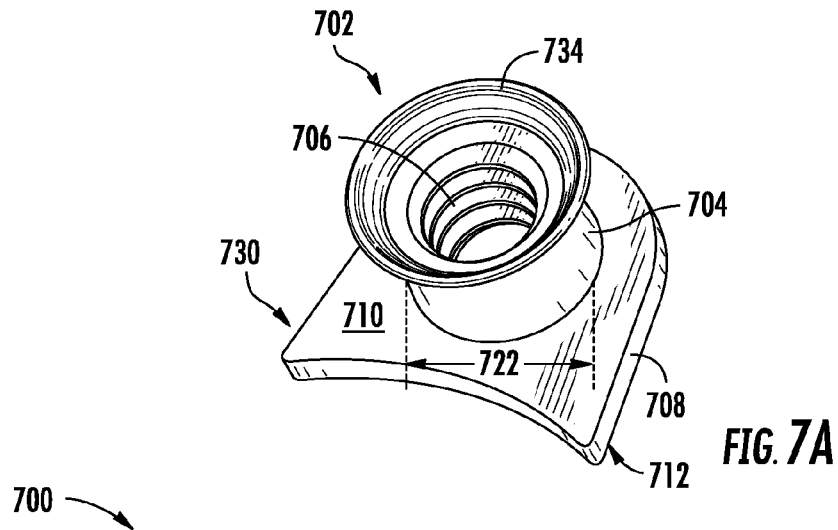
FIGS. 7A-7E illustrate isometric and top-down views of different portions of another embodiment of a floating fastener arrangement.
Figure 7B:
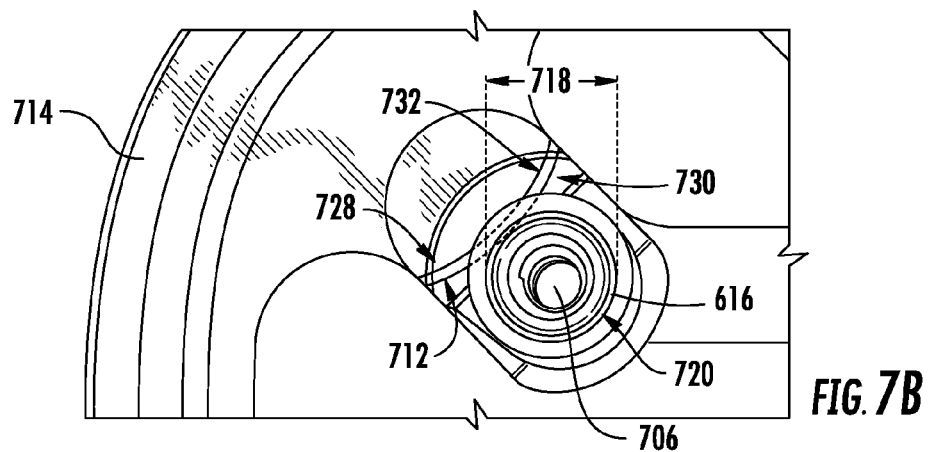
Figure 7C:
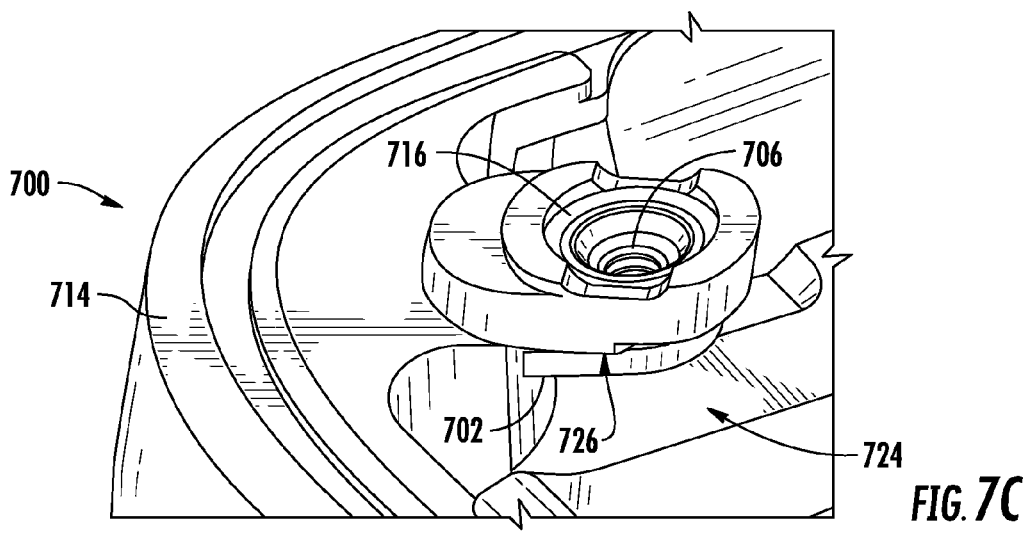

Moving to FIGS. 7A and 7B, another embodiment of a floating fastener arrangement 700 is shown. As shown, floating fastener arrangement 700 includes fastener 702, which has a cylindrical portion 704 having a threaded opening 706. Threaded opening 706 is configured to accept a screw (not shown). Fastener 702 also has flange 708 having a top surface 710 and stop surfaces 712 and 730. Fastener 702 is positioned in a portion of enclosure 714. Enclosure 714 can be, for example, top case 306 of FIG. 3C. Enclosure 714 has a clearance opening 716, which is configured to accept cylindrical portion 704 of fastener 702. As shown, clearance opening 716 has a diameter 718 that is suitably larger than an outer diameter 722 of cylindrical portion 704 so as to provide a clearance area 720 between diameter 718 of clearance opening 716 and the outer diameter 722 of cylindrical portion 704 of fastener 702. Clearance area 720 allows fastener 702 to move in a lateral direction relative to enclosure 714. Thus, an opening of a corresponding enclosure portion is allowed a considerable amount of "float" or "play" during the alignment and coupling of the corresponding enclosure portions. Thus, when an enclosure opening is not suitably aligned with threaded opening 706, fastener 702 can shift laterally within clearance area 720 to allow a screw to properly seat within threaded opening 706. If more than one fastener is used to couple the corresponding enclosure portions, multiple floating fastener arrangements can be used.

Enclosure 714 has cavity 724 having upper surface 726 and datum surfaces 728 and 732. During an assembly process when a screw is being screwed into threaded opening 706, flange 708 of fastener 702 is situated within cavity 724. Stop surface 712 can engage with datum surface 728 to limit rotation of fastener 702 in a clockwise direction. In addition, stop surface 730 can engage with datum surface 732 to limit rotation of fastener 702 in a counter clockwise direction. It should be noted that other surfaces of fastener 702 can engage with other surfaces of cavity 724 as fastener 702 is positioned within different regions of cavity 724 to limit rotation of fastener 702 during assembly. Additionally, upper surface 726 of cavity 724 can engage with top surface 710 of fastener 702, thereby preventing fastener 702 from coming out of clearance opening 716 during assembly. Furthermore, fastener 702 can have a flared portion 734 at an end opposite to flange 708, which can prevent fastener 702 from falling down through clearance opening 716. In these ways, fastener 702 can be stabilized during assembly when a screw is being threaded into threaded opening 706.

Figure 7E:
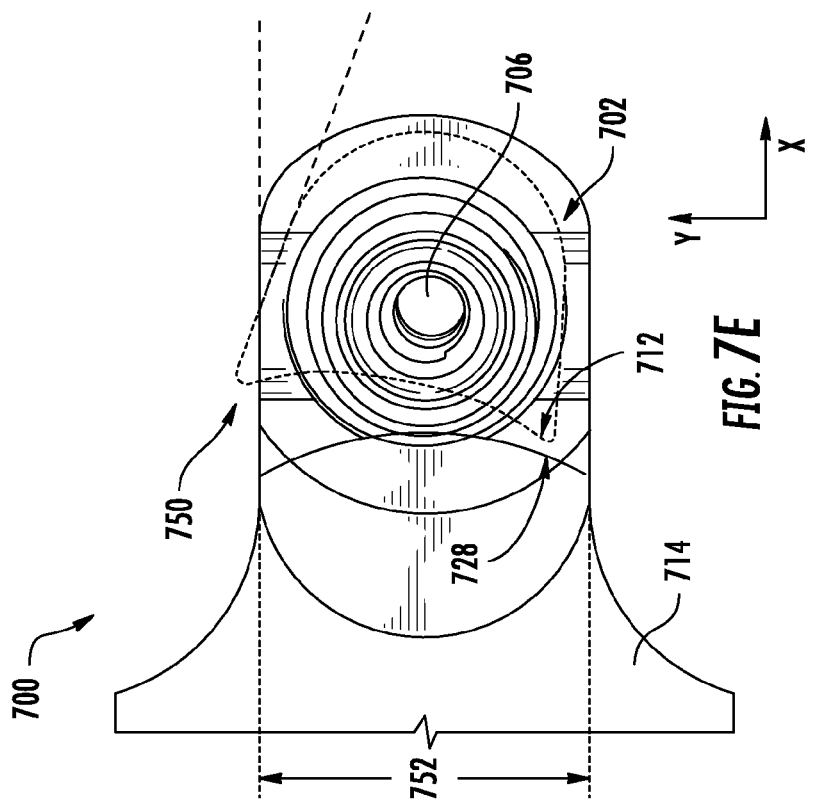
Figure 7D:
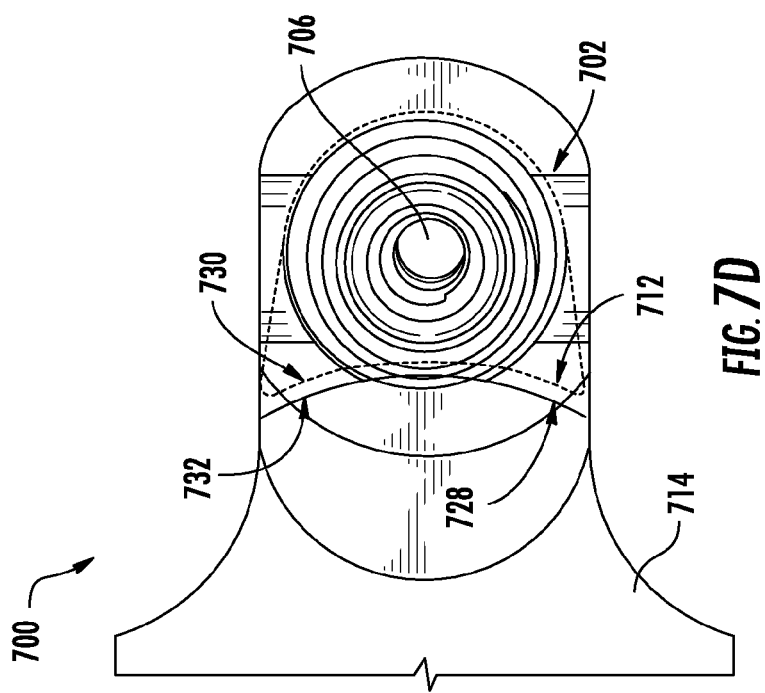

As discussed above, the floating fasteners described herein can limit the rotation of the floating fasteners while screws are engaging with the floating fasteners. FIGS. 7D and 7E show top-down views of floating fastener arrangement 700 showing a limit of rotation of fastener 702. At FIG. 7D, fastener 702 is positioned such that stop surfaces 712 and 730 are not engaging with datum surfaces 728 and 732. At FIG. 7E, a force, such as a force from a screw being turning and engaging with threaded opening 706, moves fastener 702 in a counterclockwise direction. As a result, stop surface 712 engages with datum surface 728, thereby limiting rotation of fastener 702. As shown, the rotation of fastener 702 results in a portion 750 of fastener 702 to protrude outside of cavity region 752. The design of floating fastener arrangement 700 is such that portion 750 is minimized, thereby leaving more space for other components within enclosure 714. In this way, the size or "footprint" of the floating fastener arrangement 700 is minimized so as to provide room for other components in the enclosure such as electronic components of a computer.

Continuing on, FIGS. 8A-8C show a floating fastener arrangement 800 at various stages of being formed in accordance with described embodiments. First, as shown in FIG. 8A, a T-slot cutting tool 802 is used to form a first surface 840 within cavity 824 of enclosure 814. Note that support member 844 protrudes from a corner of enclosure 814. Support member 844 can also protrude from a non-corner side of enclosure 814. Next, also shown in FIG. 8A, a second T-slot cutting tool 804, which is smaller than first T-slot cutting tool 802, is used to form a second surface 842 within cavity 824 of enclosure 814. It should be noted that in some embodiments a single type of T-slot cutting tool can be used to form the cavities of the floating fasteners described herein. Note that the T-slot cutting tools can be operated manually or by an automated machine. Next, as shown in FIG. 8B, fastener 802 (having a similar shape and size as fastener 702 of FIG. 7A) is positioned to be inserted in to clearance opening 816 of enclosure 814. Note that the top of fastener 812 has a straight cylindrical portion 804. That is, a flared portion (such as flared portion 734 of FIG. 7A) has not yet been formed. This is so that fastener 802 can fit through clearance opening 816. Note that first 840 and second 842 surfaces of within cavity 824 can be datum surfaces for stop surfaces of fastener 812 to engage with. Next, at FIG. 8C, flared portion 834 is formed in fastener 802 so that fastener 802 does not fall through clearance opening 816. Flared portion 834 can be formed, for example, by using a flare tool to push out the end of cylindrical portion 804, resulting in a flared portion 834 having a larger outer diameter compared to clearance opening 816. In one embodiment, the flare tool is a steel shaft having a threaded end configured to threadably engage with threaded opening 806. The flare tool also has a tapered sleeve that can push out the top portion of cylindrical portion 804 as the threaded end of the flare tool is screwed into threaded opening 806. Flared portion 834 can be formed either manually using a manual flare tool or automatically using an automated flare tool. Floating fastener arrangement 800 is now ready to accept a screw and couple with a corresponding enclosure portion.

Figure 9A:
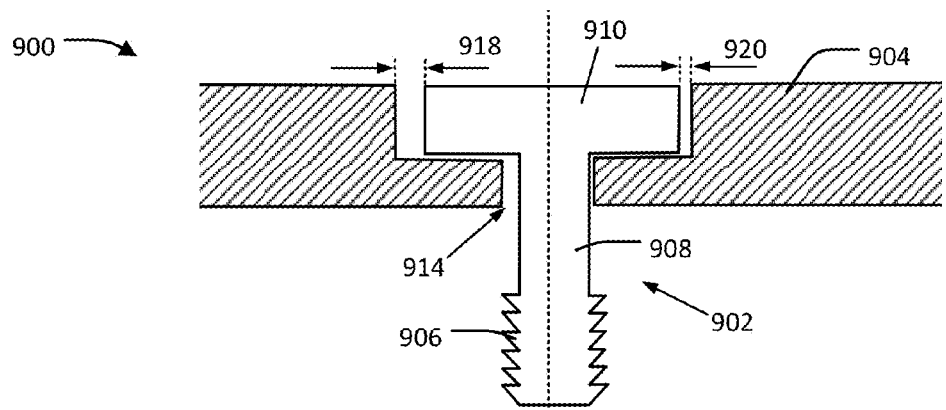
FIGS. 9A-9C illustrate close up cross-section views of a portion of an enclosure having an enclosure opening configured to accept screw.
Figure 9B:
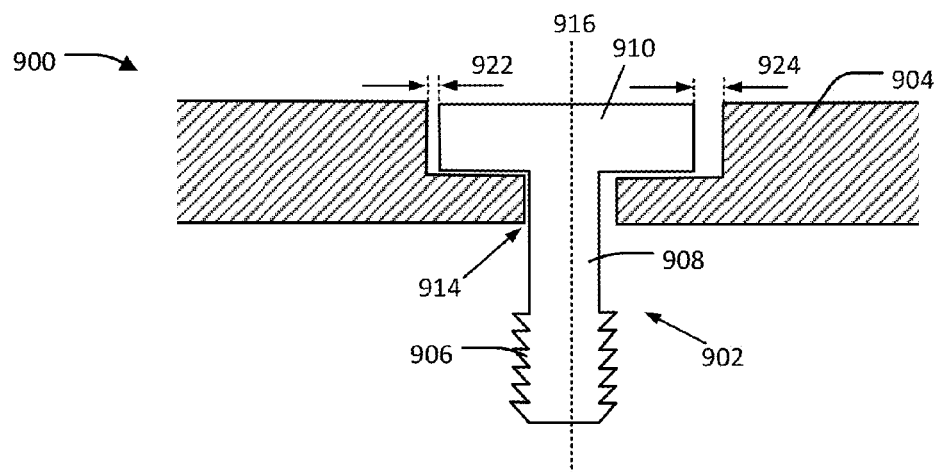

In some embodiments described herein, the screws for fastening the top and bottom cases together can have features for providing a uniform look. To illustrate, FIGS. 9A and 9B show close up cross-section views of a portion 900 of top case 904 having an enclosure opening 914 configured to accept screw 902. Screw 902 has a head 910, cylindrical portion 908 and threaded portion 906 configured to threadably engage with a corresponding floating fastener (not shown). A diameter of enclosure opening 914 is larger than an outer diameter of the cylindrical portion 908 of screw 902. At FIG. 9A, screw 902 is positioned slightly to the right of the center 916 of enclosure opening 914. If screw 902 is engaged with a corresponding floating fastener at in this configuration, the result is different distances 918 and 920 between head 910 and the edges of enclosure 904. From a top level perspective, the screw 902 will appear skewed from the center 916 of enclosure opening 914. Likewise, at FIG. 9B, screw 902 is positioned slightly to the left of center 916 of enclosure opening 914. If screw 902 is engaged with a corresponding floating fastener at in this configuration, the result is different distances 922 and 924 between head 910 and the edges of enclosure 904. From a top-level perspective, the screw 902 will appear skewed from the center 916 of enclosure opening 914. If a number of screws are used to secure the top and bottom cases together, each screw can be skewed a differing amount from their corresponding enclosure openings, resulting in an overall non-uniform appearance.

Figure 9C:
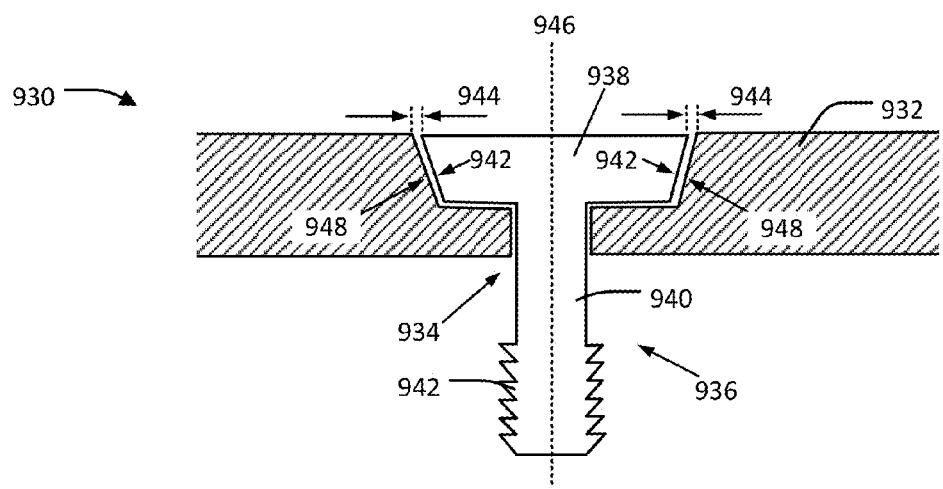

To address this issue, on some embodiments, the screws and corresponding enclosure openings can be tapered to provide an overall more uniform appearance. To illustrate, FIG. 9C show a close up portion 930 of top case 932 having enclosure opening 934 configured to accept screw 936. Screw 936 has a head 938, cylindrical portion 940 and threaded portion 942 configured to threadably engage with a corresponding floating fastener (not shown). A diameter of enclosure opening 914 is larger than an outer diameter of the cylindrical portion 940 of screw 936. Enclosure opening 934 has a tapered region 948 and screw 936 has a corresponding screw taper 942. As shown, this configuration allows screw 936 to be centered in relation to center 946 of enclosure opening 934. If screw 936 is engaged with a corresponding floating fastener in this configuration, the distance 944 between head 938 and the edges of enclosure 932 is substantially the same. That is, there is a consistent gap distance 944 around a diameter of a head 938 of screw 936 and the diameter of enclosure opening 934. If a number of screws are used to secure the top and bottom cases together, each screw can be centered with respect to their corresponding enclosure openings, resulting in an overall uniform appearance.

Figure 10:
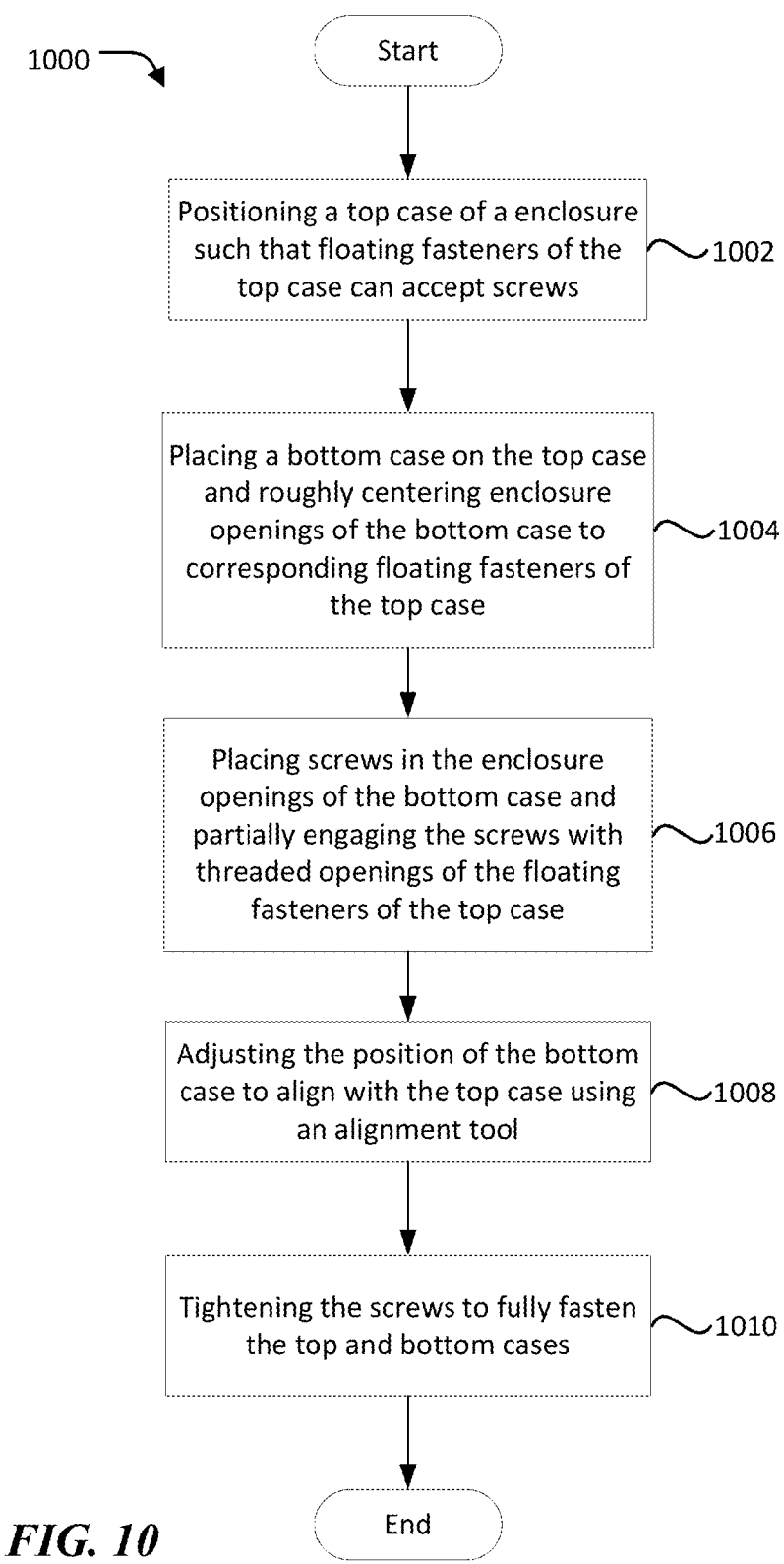
FIG. 10 illustrates a flowchart showing process steps for fastening two portions of an enclosure together using floating fasteners in accordance with described embodiments.

Moving on, FIG. 10 is a flowchart 1000 showing process steps for fastening two portions of an enclosure together using floating fasteners in accordance with described embodiments. At 1002, a top case of the enclosure is positioned such that floating fasteners positioned thereon can accept screws. For example, FIG. 3B shows interior portion of top case 106 positioned such that floating fasteners 336-340 can accept screws. In some embodiments, the top case is secured to a fixture to prevent movement of the top case during the fastening procedure. At 1004, a bottom case of the enclosure is placed on top of the top case. In addition, the enclosure openings of the bottom case are roughly centered with the threaded openings of the corresponding floating fasteners of the top case. For example, FIG. 3A shows screws 320 positioned in enclosure openings of bottom case 104 that can be roughly centered with the threaded openings of corresponding floating fasteners 336-340 of FIG. 3B during the fastening procedure. At 1006, screws are placed in the enclosure openings of the bottom case and partially engaged with the threaded openings of the floating fasteners of the top case. As described above, if the enclosure openings and the threaded openings of the floating fasteners are not suitably aligned, the floating fasteners can laterally shift within the clearance openings to allow the screws to be properly seat within the threaded openings in the floating fasteners. Note that when the screws are partially engaged, the floating fasteners are still allowed to laterally shift within the clearance openings. At 1008, the position of the bottom case is more precisely aligned with the top case. Note that the position of the bottom case can be moved laterally with respect to the top case even though the screws are partially engaged with the floating fasteners. In some embodiments, an alignment tool, such as a charge-coupled device (CCD) camera alignment tool, is used to align the edges of the top and bottom cases. In this way, once the top and bottom cases are completely fastened, the interface between the top and bottom case enclosure can have substantially no step resulting in a substantially flush interface. Other alignment tools, such as physical alignment members such a side and corner stops or laser alignment tools, can be used. At 1010, the screws are tightened to fully fasten the top and bottom cases together.

Figure 11A:
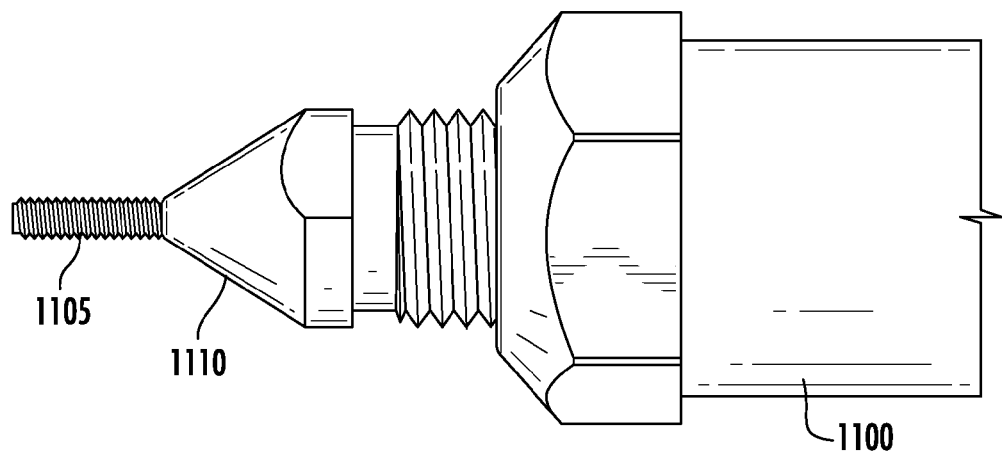
FIGS. 11A and 11B illustrate views of a tool for flaring a floating fastener.
Figure 11B:
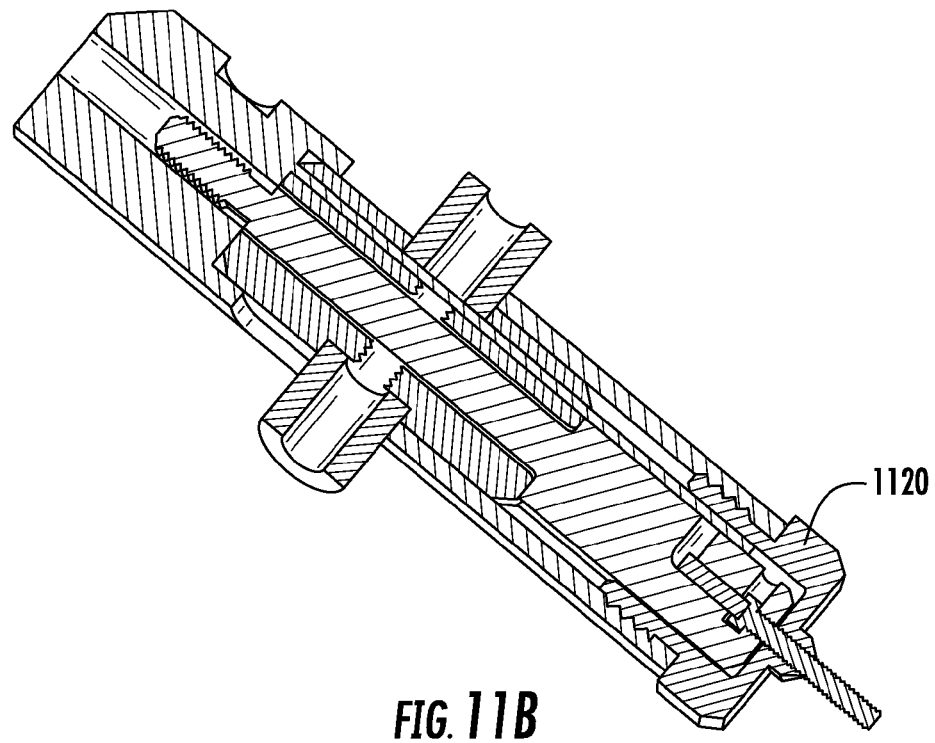

FIG. 11A is a view of one embodiment of a tool for forming a flare on a floating fastener. Oftentimes a floating fastener can include a flared portion such as shown in FIGS. 6A-6C or FIGS. 7A-7E. In some embodiments, the flared portion can be formed after the floating fastener is inserted into top case 106. The flaring tool 1100 can be used to engage the floating fastener with tip 1105 and the floating fastener can be flared with conical section 1110. FIG. 11B shows a cross sectional view 1120 of another embodiment of a floating fastener flare forming tool.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A floating fastener assembly for fastening first and second portions of an enclosure together, the first portion having an aperture and the second portion having a cavity, the floating fastener assembly comprising:
   a cylindrically shaped body characterized as having a longitudinal axis;
   a flared portion at a first end of the cylindrically shaped body, the flared portion having a first edge that defines a first circular opening and a beveled interior surface that extends from the first edge to a second edge that defines a second circular opening that is smaller than the aperture, wherein the first circular opening is larger than the aperture;
   a threaded portion of the cylindrically shaped body, the threaded portion having a threaded interior surface that extends from the second edge, the threaded interior surface capable of engaging a screw having a corresponding threaded surface, wherein during a screw insertion operation, the aperture and the beveled interior surface cooperate to align the screw with the longitudinal axis; and
   a flange at a second end of the cylindrically shaped body, the flange extending outwardly from the longitudinal axis and having a size smaller than the cavity, the flange having a top surface and a stop surface,
   wherein when the flange is within the cavity, movement in a longitudinal direction is limited by an engagement of the top surface with a first interior surface of the cavity and wherein rotational movement about the longitudinal axis is limited by an engagement of the stop surface with a second interior surface of the cavity.

2. The floating fastener assembly as recited in claim 1, wherein the screw is inserted through the aperture and threadably engages the threaded interior surface of the cylindrically shaped body to fasten the first portion to the second portion.

3. The floating fastener assembly as recited in claim 2, wherein the aperture has an opening taper and the screw has a corresponding screw taper configured such that when the first and second portions of the enclosure are fastened together, there is a consistent gap distance around a diameter of a screw head of the screw and the diameter of the aperture.

4. The floating fastener assembly as recited in claim 2, wherein the first portion is a top case of a base portion of a laptop computer and the second portion is a bottom case of the base portion of the laptop computer.

5. The floating fastener assembly as recited in claim 1, wherein the enclosure comprises multiple floating fastener assemblies arranged in multiple cavities.

6. The floating fastener assembly as recited in claim 1, wherein when the aperture and the threaded interior surface are not suitably aligned the floating fastener laterally shifts within a clearance area and within the cavity to allow the screw to properly seat within the threaded interior surface.

7. The floating fastener assembly as recited in claim 1, wherein the cavity is formed using at least one T-slot cutting tool.

8. An enclosure for a computing device having a lid portion fastened to a base portion, the base portion comprising a first portion having multiple enclosure openings and a second portion having multiple respective fastener cavities, and floating fasteners configured to be at least partially engaged within the multiple respective fastener cavities, each floating fastener comprising:
   a cylindrically shaped portion characterized as having a longitudinal axis;
   a flared portion at a first end of the cylindrically shaped portion, the flared portion having a first edge that defines a first circular opening and a beveled interior surface that extends from the first edge to a second edge that defines a second circular opening that is smaller than a respective enclosure opening, wherein the first circular opening is larger than the respective enclosure opening;
   a threaded portion having a threaded interior surface that extends from the second edge, the threaded interior surface capable of engaging a screw having a corresponding threaded surface, wherein during a screw insertion operation, the respective enclosure opening and the beveled interior surface cooperate to align the screw with the longitudinal axis; and
   a flange at a second end of the cylindrically shaped portion, the flange extending outwardly from the longitudinal axis and having a size smaller than the respective fastener cavity, the flange having a top surface and a stop surface,
   wherein when the flange of each floating fastener is within the respective fastener cavity, movement in a longitudinal direction is limited by an engagement of the top surface with an first interior surface of the respective fastener cavity and wherein rotational movement about the longitudinal axis is limited by an engagement of the stop surface with a second interior surface of the respective fastener cavity.

9. The enclosure as recited in claim 8, wherein the flared portion is configured to prevent the corresponding floating fastener from falling through a corresponding clearance opening that surrounds the cylindrical shaped portion of a respective floating fastener.

10. The enclosure as recited in claim 8, wherein when the enclosure openings and the corresponding second circular openings of the floating fasteners are not properly aligned, the floating fasteners transversely shift within corresponding clearance areas around the cylindrical shaped portion of a respective floating fastener and within the cavity to allow the screws to properly seat within the corresponding threaded interior surface.

11. The enclosure as recited in claim 8, wherein each of the enclosure openings has an opening taper and a corresponding screw taper configured such that when the lid portion and the base portion of the enclosure are fastened together, there is a consistent gap distance around screw heads of the screws and each of the corresponding diameters of the enclosure openings.

12. The enclosure as recited in claim 8, wherein the cavities are formed using a T-slot cutting tool.

13. An outer housing for a computing device, comprising:
   a bottom case adapted to contain a internal device components therein, the bottom case having fastener cavities;
   a top case adapted to seal the internal device components within the outer housing the top case comprising fastening openings; and
   floating fastener assemblies each collectively adapted to removably fasten the top case to the bottom case, wherein each of the floating fastener assemblies comprising:
      a fastener having a cylindrical portion having a threaded opening, wherein the threaded opening is configured to accept a screw;
      a flared portion at a first end of the cylindrical portion, the flared portion having a internal beveled surface that extends between a first circular opening and a second circular opening that is smaller than the first circular opening and smaller than a respective fastening opening of the bottom case; and
      a flange extending outward at a second end of the cylindrical portion, the flange having a stop surface,
      wherein the fastener cavities have datum surfaces that are configured to engage with the stop surfaces to limit rotational movement of the fastener, wherein when the fastening opening is substantially aligned with the threaded opening of the fastener the screw can threadably engage with the threaded opening of the fastener, thereby fastening the top case and the bottom case together.

14. The outer housing as recited in claim 13, wherein the stop surfaces engage with datum surfaces so as to limit the movement of the fastener while the screw is threadably engaging the top and bottom cases.

15. The outer housing as recited in claim 13, wherein when the fastener opening and the threaded opening of the corresponding floating fasteners are not suitably aligned, the floating fasteners laterally shift within the cavity to allow the screws to properly seat within the threaded openings of the floating fasteners.

* * * * *